United States Patent
Suga

(10) Patent No.: US 8,962,168 B2
(45) Date of Patent: Feb. 24, 2015

(54) STORAGE BATTERY MODULE

(75) Inventor: Atsuo Suga, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 14/009,454

(22) PCT Filed: Apr. 4, 2011

(86) PCT No.: PCT/JP2011/058540
§ 371 (c)(1),
(2), (4) Date: Oct. 2, 2013

(87) PCT Pub. No.: WO2012/137289
PCT Pub. Date: Oct. 11, 2012

(65) Prior Publication Data
US 2014/0023897 A1    Jan. 23, 2014

(51) Int. Cl.
*H01M 10/48*    (2006.01)
*H01M 2/02*    (2006.01)

(52) U.S. Cl.
CPC ............ *H01M 10/486* (2013.01); *H01M 10/48* (2013.01)

USPC ............................. 429/90; 429/178; 429/179

(58) Field of Classification Search
CPC ............................ H01M 10/48; H01M 10/486
USPC .............................................. 429/90, 178, 179
See application file for complete search history.

(56) References Cited

FOREIGN PATENT DOCUMENTS

| JP | 2002-124305 A | 4/2002 |
|---|---|---|
| JP | 2002-246074 A | 8/2002 |
| JP | 2005-078858 A | 3/2005 |
| JP | 2006-073362 A | 3/2006 |

*Primary Examiner* — Helen O Conley
(74) *Attorney, Agent, or Firm* — Volpe and Koenig, P.C.

(57) ABSTRACT

A storage battery module 20 includes plural battery cells 320 in which a wound electrode group 322 having positive and negative electrodes, and positive and negative electrode collector plates 327a and 327b connected to the positive and negative electrodes are accommodated in a battery cell 321, and positive and negative external terminals 331 and 341 are provided to be exposed to outside of the battery case 321, a circuit board 350 including a temperature detecting wiring 302 of the battery cell 320 connected to the positive and negative external terminals 331 and 341, and a temperature sensor 381 for detecting a temperature of the battery cell 320 provided above the wiring 302.

10 Claims, 13 Drawing Sheets

STORAGE BATTERY MODULE

TECHNICAL FIELD

The present invention relates to a storage battery module, and more in details, to a storage battery module having a temperature sensor of a battery cell.

BACKGROUND ART

A secondary battery cell, such as a lithium ion secondary battery cell, a nickel hydrogen secondary battery cell, a nickel-cadmium secondary battery cell and the like, has been spreading rapidly in recent years as a power source of a hybrid vehicle or an electric vehicle.

A secondary battery cell which is used as a power source for an automobile is made to be a storage battery module in which ordinarily, plural pieces of secondary battery cells are connected in series by a bus bar.

In a secondary battery cell, deterioration in a performance with regard to service life such as a reduction in capacity is liable to be brought about under a high temperature environment. Conversely, a reduction in an output of a battery is liable to be brought about under a low temperature environment.

Consequently, a secondary battery cell needs to be controlled at a pertinent temperature. Although it is inherently preferable to detect an inner temperature of a secondary battery cell, ordinarily, a surface temperature of a battery case of a secondary battery cell is detected by a temperature sensor in view of technology and in view of cost.

As such a structure, there is known a structure in which a temperature sensor is fastened to a bus bar connecting positive external terminals and negative external terminals of contiguous secondary cells, and a pair of lead terminals of the temperature sensor is soldered to a circuit pattern that is provided at a circuit board as described in Patent Literature 1.

CITATION LIST

Patent Literature

Patent Literature 1: Japanese Unexamined Patent Application Publication No. 2002-246074

SUMMARY OF INVENTION

Technical Problem

According to the invention described in Patent Literature 1, a member of attaching the temperature sensor and the circuit pattern to which the lead terminal of the temperature sensor is soldered are configured by different members. Ordinarily, the bus bars and the circuit board are not disposed on the same plane but are arranged with a stepped difference therebetween. Consequently, the lead terminal of the temperature sensor needs to be folded to bend, and therefore, there poses a problem that an assembling performance is poor, and time and labor are taken for storage and transportation in a subassembled state.

Solution to Problem

A storage battery module according to a first aspect of the present invention includes plural battery cells in which an electrode group including a positive electrode and a negative electrode, and a positive electrode collector plate and a negative electrode collector plate connected to the positive electrode and the negative electrode are accommodated in a battery case, and a positive external terminal and a negative external terminal connected to the positive electrode collector plate and the negative electrode collector plate are provided to be exposed to outside of the battery case, a circuit board connected to the positive external terminal or the negative external terminal of the battery cell, and including a wiring for temperature detection having a land, a temperature sensor that is thermally bonded to the land of the wiring and detects a temperature of the battery cell, and a voltage detecting wiring for detecting a voltage of the battery cell connected to the land.

The storage battery module according to a fourth aspect of the present invention can be made to further include a bus bar connecting the external terminals of inverse polarities of the battery cells contiguous to each other, in which the circuit board includes through holes for inserting the positive external terminal and the negative external terminal, and the land is provided at a surrounding of the through hole in the storage battery module described in the first aspect.

The storage battery module according to a fifth aspect of the present invention includes plural battery cells in which an electrode group having a positive electrode and a negative electrode, and a positive electrode collector plate and a negative electrode collector plate connected to the positive electrode and the negative electrode are accommodated in a battery case, and a positive external terminal and a negative external terminal connected to the positive electrode collector plate and the negative electrode collector plate are provided to be exposed to outside of the battery case, a circuit board connected to the positive external terminal or the negative external terminal of the battery cell, and including a wiring for temperature detection having a land, a temperature sensor that is thermally bonded to the land of the wiring and detects a temperature of the battery cell, and a bus bar that connects the external terminals of inverse polarities of the battery cells contiguous to each other, in which the circuit board includes a through hole for inserting a projected portion formed at the bus bar, and the land is provided at a surrounding of the through hole.

The storage battery module according to a sixth aspect of the present invention can be made to be a mode in which the bus bar includes welding areas welded to the positive pole external connection terminal and the negative external connection terminal, each of the welding areas includes plural welding portions, and the bus bar includes a slit provided between the welding portions in the storage battery module described in the fifth aspect.

The storage battery module according to a seventh aspect of the present invention can be made to be a mode in which the projected portion of the bus bar and the land are soldered in the storage battery module described in the fifth or sixth aspect.

It is preferable that in the storage battery module according to an eighth aspect of the present invention, the temperature sensor is arranged on the land via a thermally conductive resin therebetween, and the land is formed such that a width of a portion at which the temperature sensor is disposed is narrower than a width of a portion connected to the external terminal in the storage battery module described in any one of the first to sixth aspects.

It is preferable that in the storage battery module according to a ninth aspect of the present invention, the wiring and the temperature sensor are thermally bonded via the thermally conductive resin in the storage battery module described in any one of the first to eighth aspects.

It is preferable that in the storage battery module according to a tenth aspect of the present invention, a voltage detecting wiring for detecting a voltage of the battery cell is formed at the land in the storage battery module described in the fifth aspect.

Advantageous Effects of Invention

According to the storage battery module of the present invention, the temperature sensor is provided above the voltage detecting wiring of the circuit board, and therefore, an assembling performance is improved.

DESCRIPTION OF EMBODIMENTS

First Embodiment

An explanation will be given of an embodiment of a storage battery module according to the present invention in reference to the drawings as follows.

The storage battery module of the present invention is applicable as, for example, a storage battery device of a vehicle-mounted power source device of an electric vehicle, particularly, an electric automobile although not intended to limit thereto. The electric automobile includes a hybrid electric automobile including an engine which is an internal combustion engine and a motor as a drive source of a vehicle, a pure electric automobile which configures a motor as an only drive source of the vehicle and the like.

Hence, an explanation will be given of a drive system for a hybrid automobile to which the storage battery module according to the present invention is applied.

[Hybrid Automobile Drive System]

Figure 1:
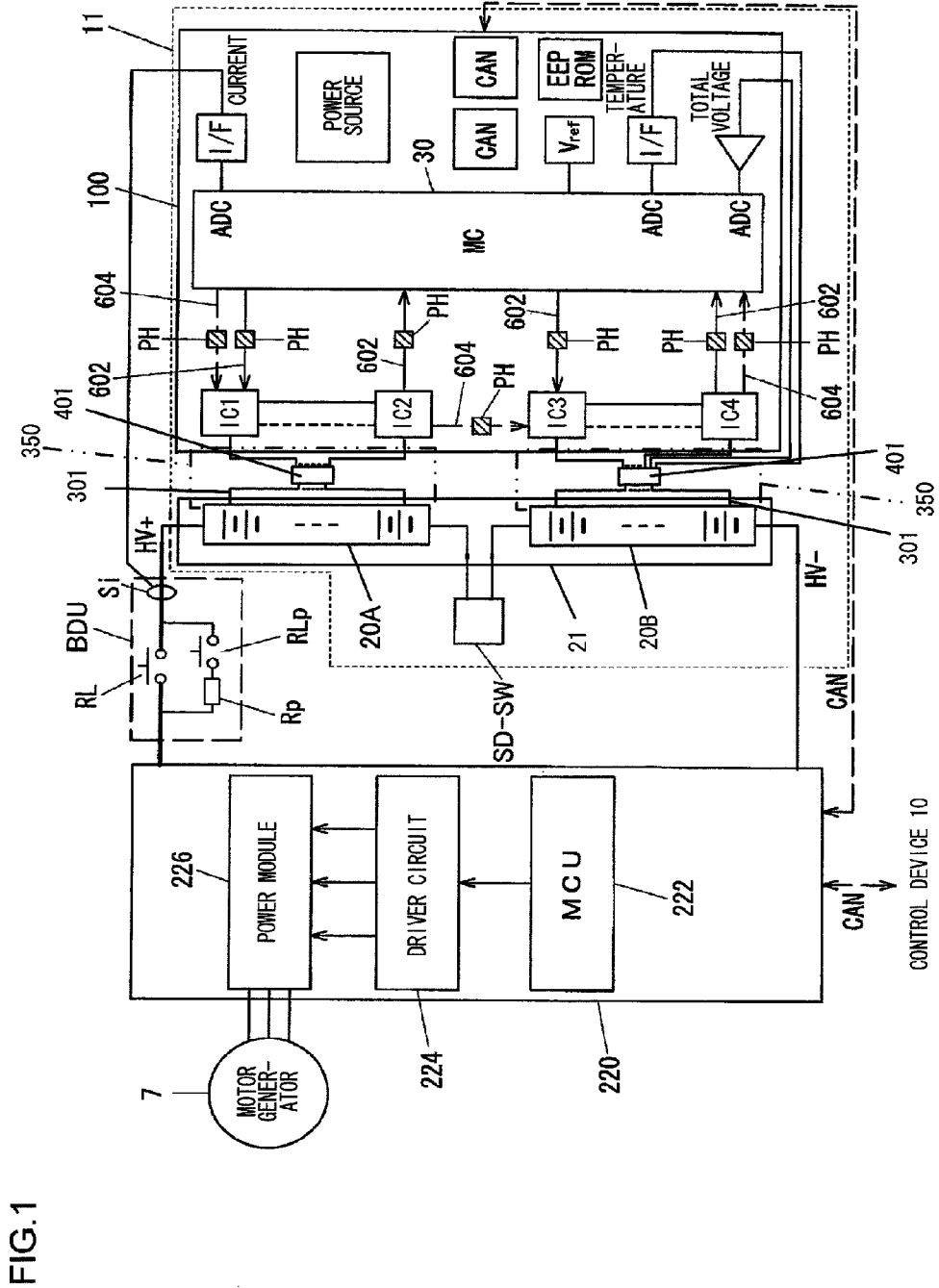
FIG. 1 is a block circuit diagram of a hybrid vehicle drive system according to an embodiment which includes a storage battery module of the present invention.

FIG. 1 is a block circuit diagram of a hybrid automobile drive system having a storage battery module according to an embodiment of the present invention.

A hybrid automobile drive system shown in FIG. 1 includes a storage battery module device 21, a battery control device 100 monitoring the storage battery module device 21, an inverter device 220 converting a direct current power from the storage battery module device 21 into three phase alternating current power, and a motor-generator 7 for driving a vehicle. The motor-generator 7 is driven by the three phase alternating current power from the inverter device 220. The inverter device 220 and the battery control device 100 are connected by CAN communication, and the inverter device 220 functions as a host controller for the battery control device 100. The inverter device 220 is operated based on instruction information from a control device 10.

The inverter device 220 includes a power module 226, MCU 222 for controlling the inverter device, and a driver circuit 224 for driving the power module 226. The power module 226 converts the direct current power supplied from the storage battery module device 21 into the three phase alternating current power for driving the motor-generator 7 as a motor. A smoothing capacitor having a large capacity of about 700 μF through about 2000 μF is provided between heavy current lines HV+ and HV− which are connected to the power module 226, although not illustrated. The smoothing capacitor is operated to reduce voltage noise applied to an integrated circuit provided at the battery control device 100.

An electric charge of the smoothing capacitor is substantially zero in an operation start state of the inverter device 220, and when a relay RL is closed, a large initial current flows to the smoothing capacitor. There is a concern of melting to destruct the relay RL owing to the large current. In order to solve such problem, in accordance with an instruction from the control device 10, MCU 222 charges the smoothing capacitor by bringing a precharge relay RLp from an open state to a closed state when the motor-generator 7 is started to be driven, and then, starts supplying a power from the storage battery module device 21 to the inverter device 220 by bringing the relay RL from an open state to a closed state and. MCU 222 carries out the charging operation while restricting a maximum current via a resistor Rp when the smoothing capacitor is charged. The relay circuit is protected, and the maximum current flowing through the battery cell and the inverter device 220 can be reduced to a prescribed value or lower and high safety can be maintained by doing such an operation.

Incidentally, the inverter device 220 operates the motor-generator 7 as a generator at the time of the vehicle braking by controlling a phase of the alternating current power generated by the power module 226 relative to a rotor of the motor-generator. That is, the inverter device 220 charges the storage battery module device 21 by making a power generated by driving the generator recur to the storage battery module device 21 by carrying out a regenerative braking control. The inverter device 220 operates the motor-generator 7 as the generator in a case where a charged state of the storage battery module device 21 is lower than a standard state. The three phase alternating current power generated by the motor-generator 7 is converted into the direct current power by the power module 226 and is supplied to the storage module device 21. As a result, the storage battery module device 21 is charged.

On the other hand, in a case of power running where the motor-generator 7 is operated as a motor, MCU 222 controls a switching operation of the power module 226 by controlling the driver circuit 224 to generate a rotating field in a leading direction relative to the rotation of the rotor of the motor-generator 7 in accordance with an instruction of the control device 10. In this case, the direct current power is supplied from the storage battery module device 21 to the power module 226. Also, MCU 222 controls the switching operation of the power module 226 by controlling the driver circuit 224 to generate a rotating field in a lagging direction relative to the rotation of the rotor of the motor-generator 7 in a case where the storage battery module device is charged by the regenerative braking control. In this case, power is supplied from the motor-generator 7 to the power module 226, and the direct current power of the power module 226 is supplied to the storage battery module device 21. As a result, the motor-generator 7 is operated as the generator.

The power module 226 of the inverter device 220 carries out a power conversion between the direct current power and the alternating current power by carrying out conducting and interrupting operation at high speed. At this occasion, a large current is interrupted at high speed, and therefore, a large voltage variation is generated according to an inductance of a direct current circuit. The smoothing capacitor having the large capacity described above is provided for restraining the voltage variation.

The storage battery module device 21 is configured by, for example, here, two of storage battery modules 20A and 20B which are connected in series with each other. The respective storage battery modules 20A and 20B include a plurality of cell groups connected in series, and each cell group includes a plurality of battery cells connected in series with each other. The storage battery module 20A and the storage batter module 20B are connected in series with each other via a service disconnect SD-SW for maintenance and check in which a switch and a fuse are connected in series. The series circuit of the electric circuits is interrupted by opening the service disconnect SD-SW, and a current does not flow even when a circuit connected to a vehicle is produced assumedly at one portion of either of the storage battery modules 20A and 20B. High safety can be maintained by such a configuration. Also, even when an operator touches an interval between HV+ and HV− in checking, the touching operation is safe since a high voltage is not applied to the human body.

There is provided a battery disconnect unit BDU including the relay RL, the resistor Rp, and the precharge relay RLp at the heavy current line HV+ between the storage battery module device 21 and the inverter device 220. A series circuit of the resistor Rp and the precharge relay RLp is connected in parallel with the relay RL.

The battery control device 100 mainly measures voltages of respective battery cells, measures a total voltage, measures a current, and adjusts a temperature of the battery cell and capacities of the respective battery cells and so on. For that purpose, plural battery controlling IC's (integrated circuits) are provided as cell controllers. The plural battery cells provided in the respective storage battery modules 20A and 20B are classified into plural cell groups, and cell controller IC's controlling the battery cells included in the respective cell groups are individually provided for the respective cell groups.

A battery storage device 11 is configured by the battery control device 100 and the storage battery module device 21.

The battery control device 100 and the storage battery module device 21 are connected by a wiring for detecting a voltage via a connector provided at a board of the battery control device 100 as described later. The wiring for detecting the voltage is used for detecting a voltage of each battery cell configuring the storage battery module, and is used for discharging (balancing) of each battery cell. According to the present invention, the wiring for detecting the voltage is used further for charging.

Cell controllers IC1 through IC4 for controlling respective cell groups respectively include communication systems 602 and 1 bit communication systems 604. In the communication system 602 for reading cell voltage values and transmitting various kinds of commands, the communication system 602 carries out serial communication with a microcomputer 30 controlling the storage battery module device 21 by a daisy chain system via an insulating element (for example, photocoupler) PH. The 1 bit communication system 604 transmits an abnormality signal when cell overcharging is detected. In an example shown in FIG. 1, the communication system 602 is divided into a higher-level communication path corresponding to the cell controllers IC1 and IC 2 of the storage battery module 20A and a lower-level communication path corresponding to the cell controllers IC3 and IC4 of the storage battery module 20B.

That is, the microcomputer 30 functions as a control device at a level higher than the cell controllers IC1 through IC4.

Each cell controller IC performs an abnormality diagnosis, and transmits an abnormality signal from a transmitting terminal in a case where each cell controller IC per se is determined to be abnormal, or in a case where each cell controller IC receives an abnormality signal from a cell controller IC at a higher level by a receiving terminal. On the other hand, the abnormality signal to be transmitted from the transmission terminal vanishes in a case where the abnormality signal which has been received already at the receiving terminal vanishes, or the abnormality determination of each cell controller IC per se becomes a normality determination. The abnormality signal is a 1 bit signal according to the present embodiment.

Although the microcomputer 30 does not transmit an abnormality signal to the cell controller IC, the microcomputer 30 transmits a test signal which is a quasi-abnormality signal to the 1 bit communication system 604 in order to diagnose whether the 1 bit communication system 604 which is the transmission path of the abnormality signal is correctly operated. The cell controller IC1 which receives the test signal transmits the abnormality signal to the communication system 604, and the abnormality signal is received by the cell controller IC2. The abnormality signal is transmitted from the cell controller IC2 to the cell controllers IC3 and IC4 in this order, and finally returned from the cell controller IC4 to the microcomputer 30. When the communication system 604 is normally operated, the quasi-abnormality signal transmitted from the microcomputer 30 is returned to the microcomputer 30 via the communication system 604. The communication system 604 can be examined by transmitting and receiving the quasi-abnormality signal from and to the microcomputer 30 in this way, and reliability of the system is improved.

A current sensor Si constituted of a Hall element or the like is installed in the battery disconnect unit BDU, and an output of the current sensor Si is inputted to the microcomputer 30.

Also, signals with regard to a total voltage of the storage battery module device 21 and temperatures of respective battery cells are inputted to the microcomputer 30, and measured respectively by an AD converter (ADC) of the microcomputer 30. Temperature sensors are provided at plural locations in the storage battery modules 20A and 20B.

Incidentally, the microcomputer 30 controls a number of revolutions of a cooling fan cooling the storage battery modules 20A and 20B, or controls a driver adjusting a supply amount of cooling water and a number of revolutions of a pump, although not illustrated, based on the inputted temperatures of respective battery cells, or the average temperatures of the storage battery modules 20A and 20B.

Cell voltages of 32 pieces of the battery cells need to be equalized in order to maximally utilizing a performance of the storage battery module device 21. For example, a regenerative operation needs to be stopped at a time point at which the battery cell having the highest voltage reaches an upper limit voltage in the regenerative charge in a case where dispersion in the cell voltages is large. In this case, although the cell voltages of the other battery cells do not reach the upper limit, the regenerative operation is stopped and the energy is consumed for braking Respective IC's carry out a discharging operation for adjusting capacities of the battery cells by a command from the microcomputer 30 in order to prevent such a situation.

A resistor and a balancing switch are arranged to be connected in series with each other between a positive terminal and a negative terminal of each battery cell, although not illustrated. Hence, the balancing switch is made ON by transmitting a discharge instruction from the microcomputer 30 in order to discharge the battery cell. Thereby, a balancing current flows through a path from the positive terminal, the resistor, the balancing switch, the resistor, to the negative terminal of the battery cell.

The communication systems 602 and 604 are provided among IC1 through IC4 as described above. The communication command from the microcomputer 30 is inputted to the communication system 602 via the photocoupler PH, and received by the receiving terminal of IC1 via the communication system 602. A data or a command in accordance with the communication command is transmitted from the transmitting terminal of IC1. The communication command received by the receiving terminal of IC2 is transmitted from the transmitting terminal. Reception and transmission are carried out successively in this way, and a transmission signal is transmitted from the transmitting terminal of IC4 and received by the receiving terminal of the microcomputer 30 via the photocoupler PH. IC1 through IC4 carry out transmission of measured data of the cell voltage and the like to the microcomputer 30, or the balancing operation in accordance with the received communication command. Respective IC1 through IC4 detect cell overcharge based on the measured cell voltage. The detection result (abnormality signal) is transmitted to the microcomputer 30 via the signal system 604.

[Storage Battery Module]

The storage battery module device 21 is connected to the battery control device 100 by a wiring 301 for detecting the voltage via a connector 401 as described above.

Signals with regard to the total voltage of the storage battery module device 21 and temperatures of the respective battery cells are inputted to the microcomputer 30.

The storage battery module device 21 is connected to the current sensor Si, and the output of the current sensor Si is inputted to the microcomputer 30.

When the motor-generator 7 is operated as a generator, a power generated by the motor-generator 7 charges the respective battery cells of the storage battery module device 21 by the regenerative control. In a case where the battery cell in the storage battery module device 21 is overcharged, the battery cell is discharged via the balancing switch (not illustrated).

The storage battery module device 21 is configured by connecting the two storage battery modules 20A and 20B by the service disconnect SD-SW.

The respective battery cells of the respective storage battery modules 20A and 20B are connected to the wirings 301 for detecting the respective voltages formed at circuit boards 350 as illustrated in FIG. 1 by a two-dotted chain line. The circuit board 350 is provided with the connector 401, and the wirings 301 for detecting the respective voltages are connected to the battery control device 100 via the connector 401.

An explanation will be given of structures of the storage battery modules 20A and 20B as follows. However, the storage battery modules 20A and 20B basically have the same function and the same structure. Therefore, an explanation will be given of a storage battery module 20 as a representative.

Figure 2:
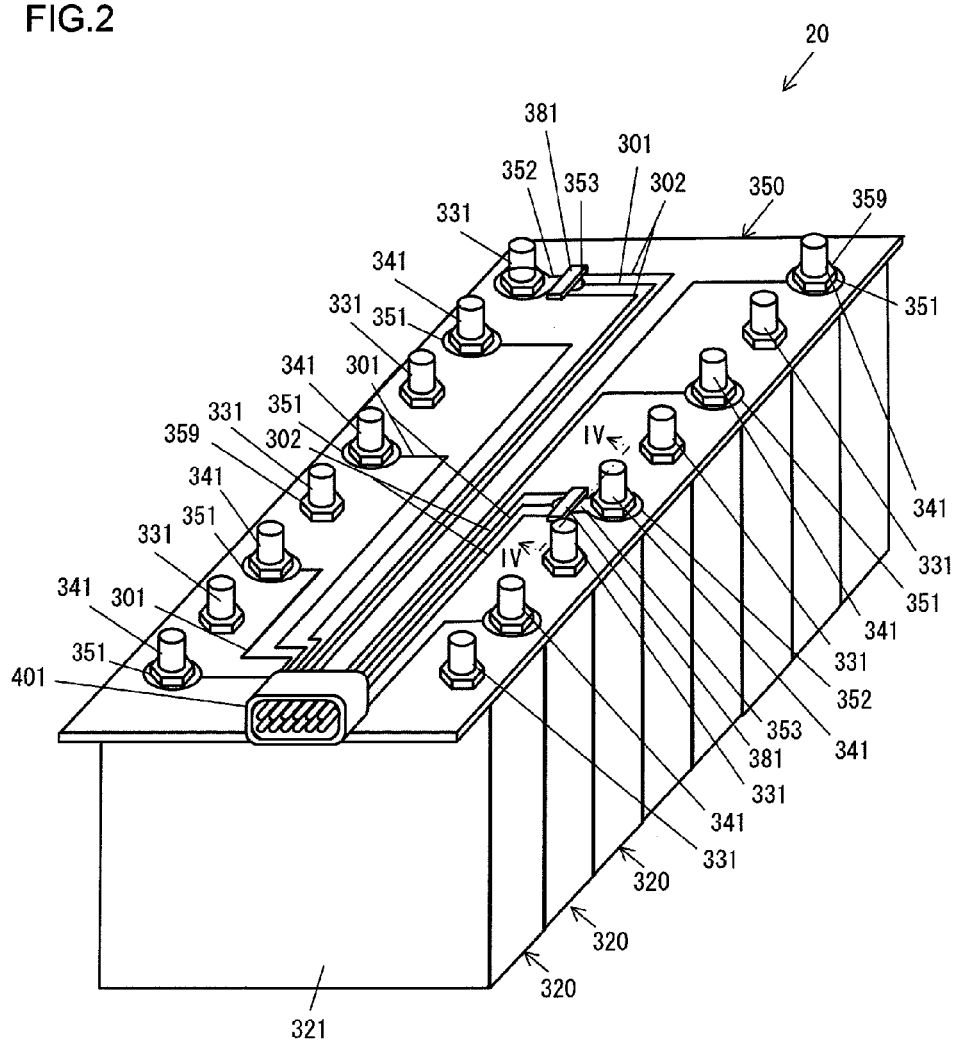
FIG. 2 is an outlook perspective view of the storage battery module according to the embodiment of the present invention.
Figure 3:
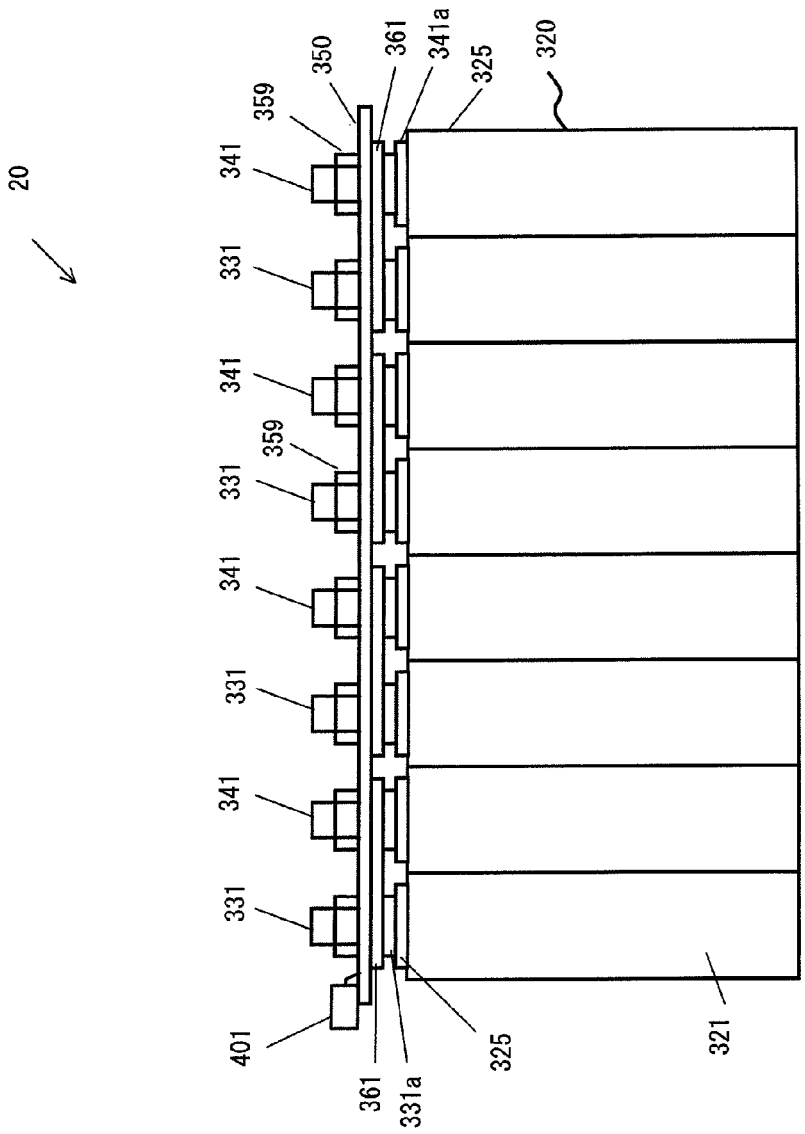
FIG. 3 is a total side view viewing the battery storage module illustrated in FIG. 2 from a side face thereof.

FIG. 2 is a perspective view of an outlook of the storage battery module according to the embodiment of the present invention, and FIG. 3 is a total side view viewing the storage battery module illustrated in FIG. 2 from a side face thereof.

The storage battery module 20 includes 8 pieces of battery cells 320. Each battery cell 320 is, for example, a prismatic lithium ion secondary cell, and has a flat rectangular parallelepiped shape as a whole. The battery cell 320 includes a battery case 321, and a positive external terminal 331 and a negative external terminal 341 which are projected to outside of the battery case 321.

The battery cells 320 are aligned with wide width faces thereof are brought into close contact with each other by directing the positive external terminals 331 and the negative external terminals 341 inversely alternately, in other words, in a state where the external terminals having inverse polarities are made to be opposed to each other.

The contiguous positive and negative external terminals 331 and 341 are connected by a bus bar 361. In this case, the positive external terminal 331 and the negative external terminal 341 of one piece of the battery cell 320 are respectively connected to the negative external terminal 341 and the positive external terminal 331 of the different battery cells 320, and all of 8 pieces of the battery cells are connected in series with each other. The negative external terminal 341 of the first battery cell 320 and the positive external terminal 331 of the final battery cell 320 connected in series with each other are not connected by the bus bar 361, but directly connected to the voltage detecting wirings 301 as described later.

The circuit board 350 is arranged on the bus bar 361. An upper face of the circuit board 350 is formed with the plural voltage detecting wirings 301, and the temperature detecting wirings 302 and provided with the connector 401 connected with the wirings 301 and 302.

The voltage detecting wirings 301 are connected to an operational amplifier via a multiplexer although not illustrated. The voltages of the respective battery cells 320 are detected by the operational amplifier by successively switching connections with the battery cells 320 by a multiplexer. The detected voltages of the respective battery cells 320 are converted into digital values at an A/D converter circuit and stored in a memory unit of the microcomputer 30.

The positive external terminal 331 and the negative external terminal 341 connected by the single bus bar 361 are at the same potential. Hence, the voltage detecting wiring 301 is provided in correspondence with the respective external terminals connected by the bus bar 361. The present embodiment exemplifies a case where the wirings 301 for detecting the voltages are formed in correspondence with the respective negative external terminals 341.

The circuit board 350 is formed with lands 351 in correspondence with the respective negative external terminals 341. The negative external terminal 341 and the positive external terminal 331 are members in a bolt-like shape formed with screwed portions at outer peripheries thereof, and respectively fixed to the circuit board 350 by nuts 359.

The circuit board 350 is formed with the land 351 in correspondence with the negative external terminal 341, and the negative external terminal 341 is thermally and electrically connected to the land 351 via the nut 359 by fastening the nut 359.

Lands 352 having a shape different from that of the land 351 are formed in correspondence with the negative external terminal 341 of the battery cell 320 arranged substantially at a center portion of the storage battery module 20 and the positive external terminal 331 of the battery cell 320 disposed at a final position of the alignment of the storage battery module 20.

The land 352 includes a projected portion 353 extended to a center side of the circuit board 350. A temperature sensor (temperature detector) 381 is mounted above the projected portion 353 of the land 352 by riding over the projected portion 353. The voltage detecting wiring 301 is connected to the projected portion 353 of the land 352. The temperature detecting wirings 302 are connected to a pair of connection terminals of the temperature sensor 381. Other end sides of the temperature detecting wirings 302 are connected to the connector 401.

Figure 4:
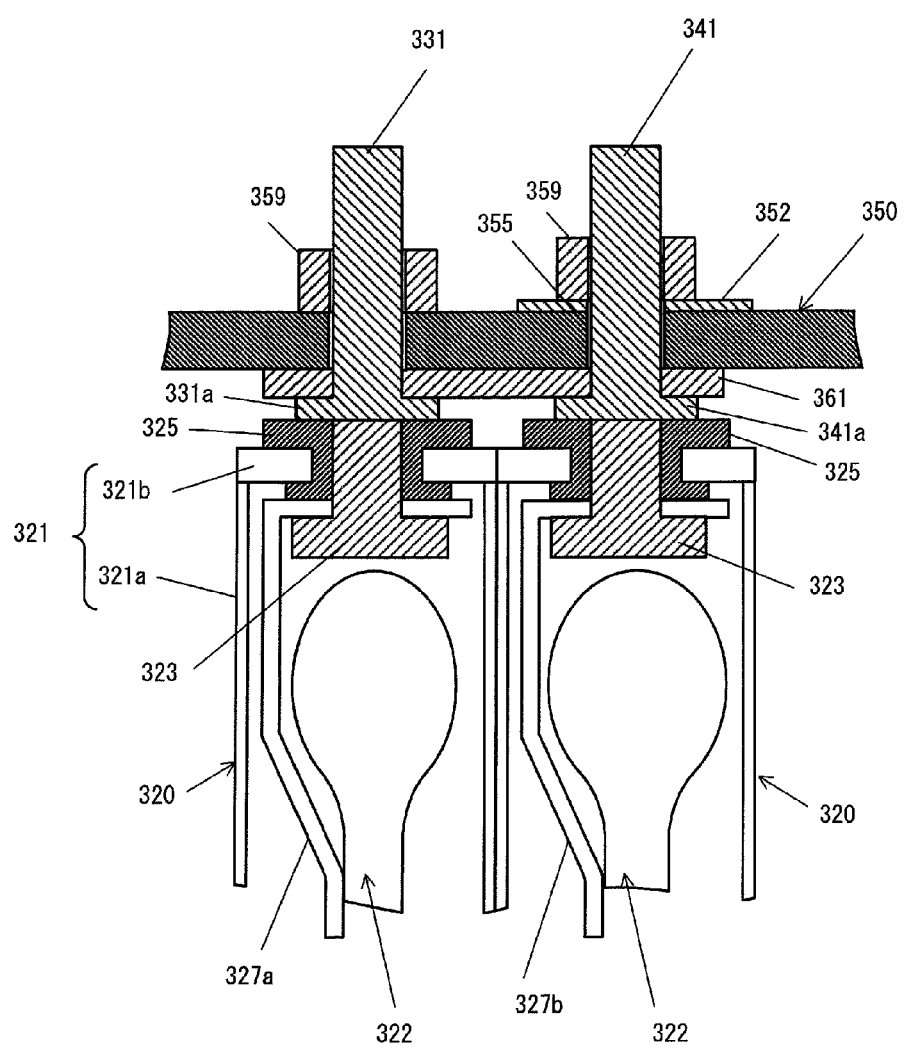
FIG. 4 is an enlarged sectional view cut along IV-IV line of the storage battery module illustrated in FIG. 2.

FIG. 4 is an enlarged sectional view cut along a line IV-IV of the storage battery module 20 illustrated in FIG. 2.

The battery cell 320 includes the battery case 321 in a prismatic flat shape. The battery case 321 is configured by a battery can 321a having an opening at an upper portion thereof, and a lid 321b bonded to the battery can 321a by laser welding or the like to close the opening portion of the battery can 321a. The lid 321b is formed by, for example, aluminum.

The lid 321b is formed with a through hole for inserting an electrode connection plate 323 which is connected to the positive external terminal 331 or the negative external terminal 341. The through hole is fitted with an insulating member 325 having an opening portion at a center portion thereof, and the electrode connection plate 323 is fitted to the through hole of the insulating member 325.

A wound electrode group 322 is accommodated at inside of the battery case 321. The wound electrode group 322 is formed by winding a positive pole electrode and a negative pole electrode, with a separator interposed therebetween, into a flat shape, although not illustrated.

In a case of a lithium ion secondary cell, the positive pole electrode is coated with positive electrode active-material-mix layers on both faces of a positive pole metal foil configured by, for example, an aluminum foil or the like. The positive electrode active-material-mix layer is coated such that an untreated portion of the positive electrode active-material-mix layer where the positive pole metal foil is exposed is formed at one side edge of the positive pole metal foil.

The negative electrode is coated with negative electrode active-material-mix layers on both faces of a negative pole metal foil configured by a copper foil or the like. The negative electrode active-material-mix layer is coated such that an untreated portion of the negative electrode active-material-mix layer where the negative metal foil is exposed is formed at other side edge of the negative electrode pole metal foil which is a side edge opposed to the side edge of the positive pole metal foil where the untreated portion of the positive electrode active-material-mix layer is arranged.

The positive electrode active-material-mix is produced by adding 10 weight parts of scaly graphite as an electrically conductive material and 10 weight parts of PVDF as a binding agent to 100 weight parts of lithium manganese oxide (chemical formula $LiMn_2O_4$) as a positive electrode active material, adding NMP to the active material mix as a dispersion solvent, and kneading the active material mix. The positive electrode active-material-mix layer is coated on both faces of an aluminum foil having a thickness of 20 μm while leaving the untreated portion of the positive electrode active-material-mix. Thereafter, the coated entity is dried, pressed, and cut to thereby provide the positive pole electrode having a coated portion of the positive electrode active material of a thickness of 90 μm which does not include the aluminum foil.

The negative electrode active-material-mix is produced by adding 10 weight parts of polyvinylidene fluoride (hereinafter, referred to as PVDF) as a binding agent to 100 weight parts of an amorphous carbon powder as a negative electrode active material, adding N-methylpyrrolidone (hereinafter, referred to as NMP) as the dispersion solvent to the active material mix, and kneading the active material mix. The negative electrode active-material-mix is coated on both faces of a copper foil having a thickness of 10 μm while leaving the untreated portion of the negative electrode active-material-mix. Thereafter, the active material mix is dried, pressed, and cut to thereby provide the negative pole electrode having the coated portion of the negative electrode active material of a thickness of 70 μm which does not include the copper foil.

A nonaqueous electrolyte is filled into the battery case 321. As the nonaqueous electrolyte, there is used, for example, the nonaqueous electrolyte dissolving lithium phosphate hexafluoride into a mixture solution of ethylene carbonate (EC), dimethyl carbonate (DMC), and diethyl carbonate (DEC) having volume ratios of 1:1:1 to be 1 mol/L.

At the electrode connecting plate 323 on one side, a positive electrode collector plate 327a is fixed to the lid 321b by calking or the like. The positive electrode collector plate 327a is formed by aluminum or the like.

At the electrode connection plate 323 on the other side, a negative electrode collector plate 327b is fixed to the lid 321b by calking or the like. The negative electrode collector plate 327b is formed by copper or the like.

In the wound electrode group 322, layers of the untreated portion of the positive electrode active-material-mix of the wound positive pole electrode are laminated on top of another on one edge side, and layers of the negative electrode active-material-mix untreated portion of the negative electrode active-material-mix are laminated on top of another on the other edge side opposed to the one edge side.

The positive electrode collector plate 327a and the negative electrode collector plate 327b have a shape of being folded to bend from an attaching portion attached to the lid 321b substantially in a vertical direction, inclined to a center portion side in a thickness direction of the battery cell 320, and bent again at a center portion in the direction vertical to the attaching portion. At the center portion, the positive electrode collector plate 327a is bonded to the untreated portion of the positive electrode active-material-mix, and the negative electrode collector plate 327b is bonded to the untreated portion of the negative electrode active-material-mix by ultrasonic welding or the like.

The collector plates 327a and 327b as well as the electrode connection plates 323 of the positive and negative poles are insulated from the lid 321b by the insulating members 325.

The positive external terminal 331 or the negative external terminal 341 respectively formed with screwed portions on outer peripheries are connected onto the respective electrode connection plates 323. The connection can be carried out by calking the positive external terminal 331 or the negative external terminal 341 and the respective electrode connection plates 323 directly or via electrically conductive connection plates (not illustrated).

The positive external terminal 331 and the negative external terminal 341 respectively include large diameter portions 331a and 341a.

The positive external terminal 331 and the negative external terminal 341 contiguous to each other are connected by the bus bar 361. The bus bar 361 is formed with through holes for inserting the positive external terminal 331 and the negative external terminal 341. The positive external terminal 331 and the negative external terminal 341 are inserted to the through holes, and the bus bar 361 is bonded to the large diameter portions 331a and 341a of the positive and the negative external terminals 331 and 341 by arc welding of TIG (Titan Inert Gas).

[Voltage Detecting Circuit Board]

A voltage detecting circuit board 330 is mounted on the bus bar 361.

Figure 5:
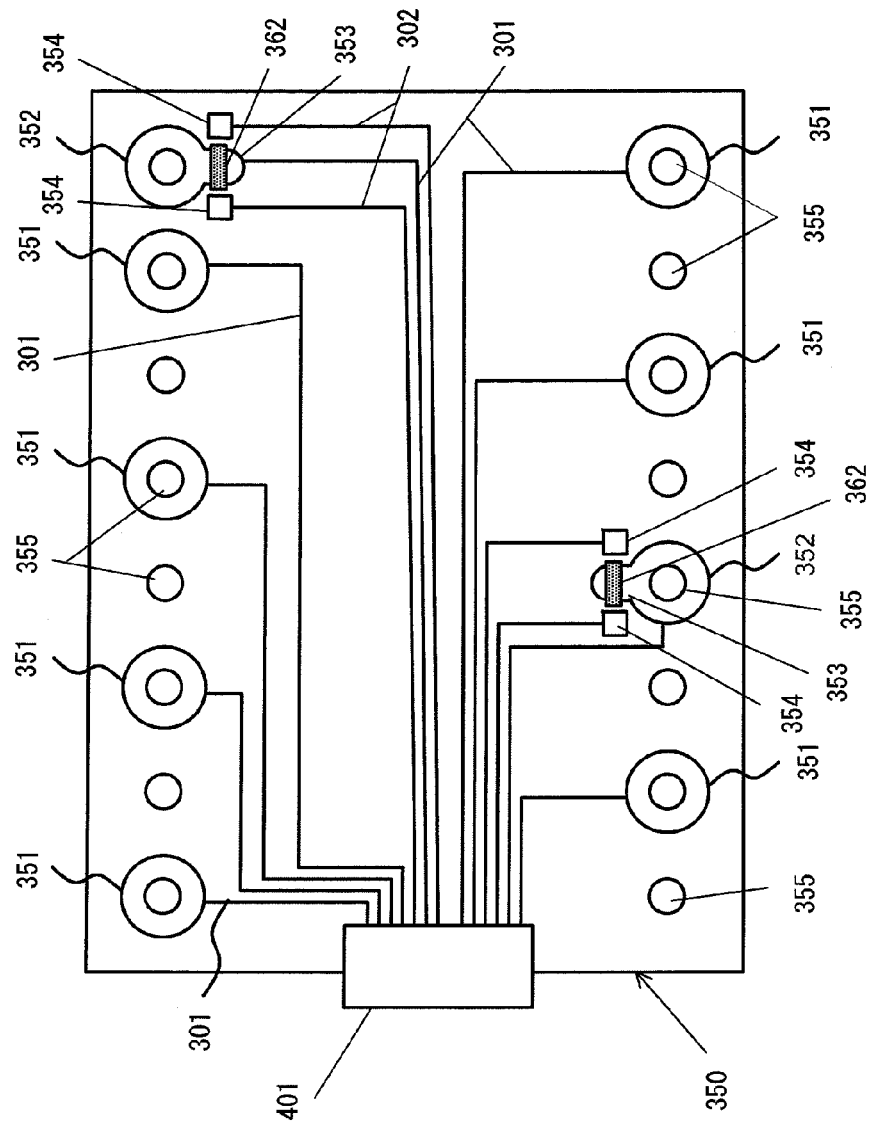
FIG. 5 is a plane view of a circuit board for detecting a voltage which is provided at the storage battery module of the present invention according to the embodiment.
Figure 6:
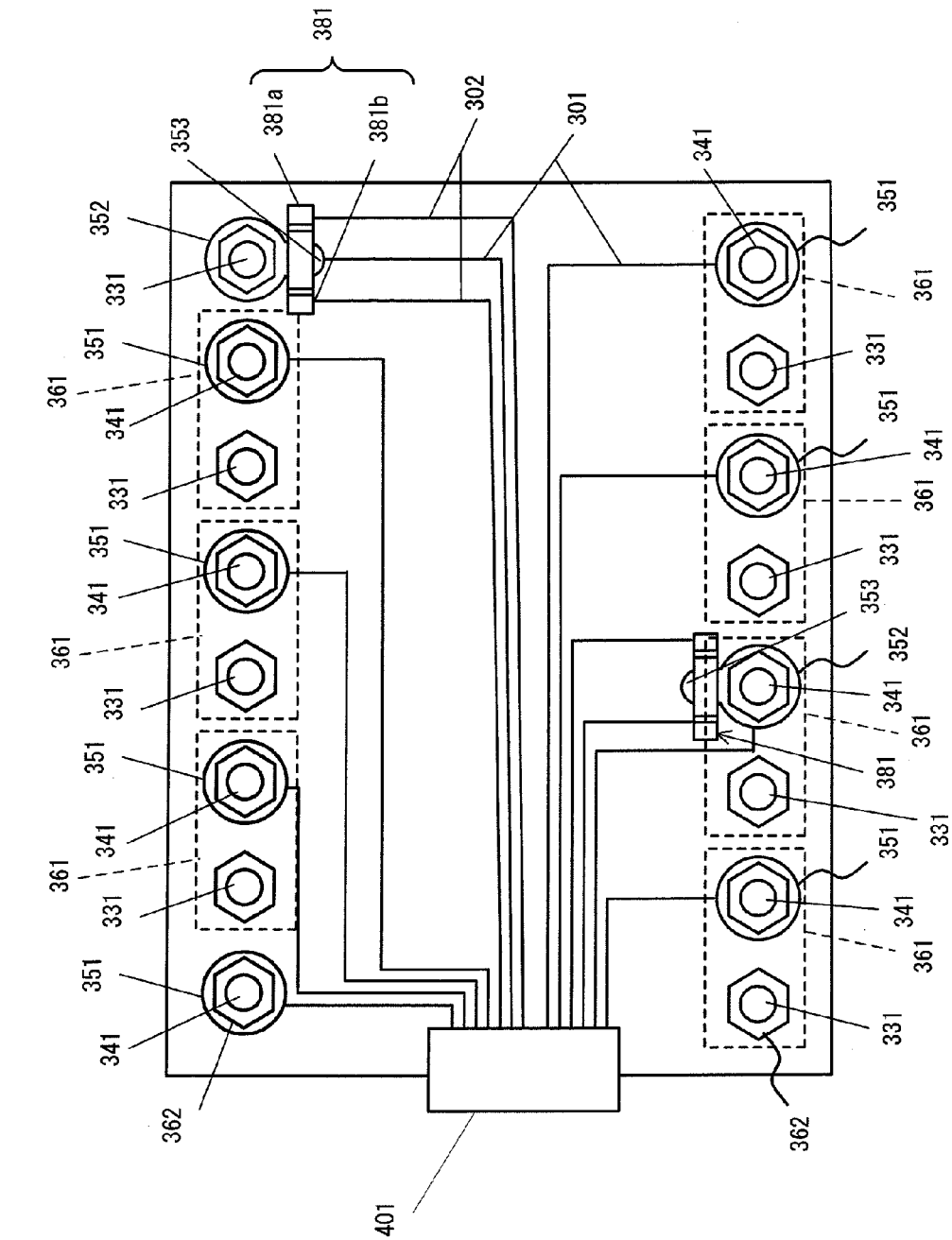
FIG. 6 is a plane view of the storage battery module illustrated in FIG. 2.

FIG. 5 is a plane view on an upper face side of the voltage detecting circuit board 350, and FIG. 6 is a plane view on an upper face side of the storage battery module 20. In the following explanation, FIG. 4 as well as FIG. 5 and FIG. 6 are referred.

The circuit board 350 is formed with the land 351 in correspondence with the negative external terminal 341. The lands 352 are formed in correspondence with the negative external terminal 341 of the battery cell 320 arranged substantially at a center portion of the storage battery module 20, and the positive external terminal 331 of the battery cell 320 disposed at the final location of the alignment of the storage battery module 20. The circuit board 350 is formed with through holes 355 for inserting the positive external terminals 331 or the negative external terminals 351.

The positive external terminals 331 and the negative external terminals 341 are projected to the upper side of the circuit board 350 by passing through the through holes 355 of the circuit board 350. The circuit board 350 and the bus bars 361 are fastened by screwing the nuts 359 to the projected portions. Thereby, 8 pieces of the battery cells 320 and the circuit board 350 are integrated.

Under the state, a thermal and electrical connection is carried out by a path of the negative electrode active-material-mix untreated portion of the wound electrode group 322, the negative electrode collector board 327b, the electrode connection plate 323, the negative external terminal 341, the nut 359, and the land 351 or 352 on the negative electrode side. A thermal and electrical connection is carried out at the land 352 formed in correspondence with the positive external terminal 331 of the battery cell 320 disposed at the final location of the alignment of the storage battery module 20, by a path of the positive electrode active-material-mix untreated portion of the wound electrode group 322, the positive electrode collector plate 327a, the electrode connection plate 323, the positive external terminal 331, the nut 359, and the land 352.

A projected portion 353 having a width narrower than that of a portion of fastening the nut 359 is formed at the land 352 provided at the circuit board 350 as illustrated in FIG. 5. Pads 354 are provided on both sides in a width direction of the projected portion 353 of the circuit board 350. The temperature detecting wirings 302 formed at the circuit board 350 connect the respective pads 354 and the connector 401. A thermally conductive member 362 configured by a putty or an adhering sheet having a high thermal conductivity is formed on the projected portion 353 of the land 352. As the thermally conductive member 362, for example, a silicone species resin or the like can be used.

A temperature sensor 381 is mounted on the thermally conductive member 362. The temperature sensor 381 is of a chip type and is arranged with a pair of connection terminals 381a and 381b in a state of riding over the projected portion 353 of the land 352 in a width direction to respectively correspond to the pads 354. The pair of connection terminals 381a and 381b is respectively soldered to the pads 354 by a soldering operation. The thermally conductive member operates to prevent a thermal conductivity from lowering by interposing air between the land 352 and the temperature sensor 381.

FIG. 6 illustrates a plane view from an upper face side of the storage battery module 20 formed in this way.

In the battery storage module 20 according to the present embodiment, the positive external terminal 331 and the negative external terminal 341 of the contiguous battery cells 320 are connected by the bus bar 361. The respective negative external terminals 341 are connected to the voltage detecting wirings 301 via the lands 351 or 352 provided at the circuit board 350. The negative external terminal 341 of the first battery cell 320 and the positive external terminal 331 of the last battery cell 320 in the alignment of the storage battery module 20 are directly connected to the voltage detecting wiring 301 provided at the circuit board 250.

Consequently, dispersion in voltages among the battery cells 320 can be reduced by detecting the voltages of the respective battery cells, inputting signals concerning the voltages to the microcomputer 30 via the battery control device 100, and controlling to charge and discharge the respective battery cells 320.

In the storage battery module 20 according to the present embodiment, the temperature sensor 381 is mounted at the land 352 formed at the circuit board 350. Temperatures of the respective battery cells 320 are transferred to the lands 352 via the negative external terminals 341 and the nuts 359, and therefore, the temperatures of the respective battery cells 320 can be detected by the temperature sensors 381. Signals concerning the temperatures detected by the temperature sensors 381 are inputted to the microcomputer 30 through the temperature detecting wirings 302 formed at the circuit board 350 via the battery control device 100. The microcomputer 30 can control a number of revolutions of a cooling fan or a driver and a number of revolutions of a pump for adjusting an amount of supplying cooling water based on the inputted temperatures of the respective battery cells 320 or an average temperature of the storage battery module 20, although not illustrated.

In the battery storage module 20 according to the present embodiment, the temperature sensor 381 is mounted at the land 352 formed at the circuit board 350 as described above. The land 352 and the temperature detecting wiring 302 are formed on the same circuit board 350. Therefore, an assembling performance is excellent and productivity can be improved.

In the storage battery module 20 according to the present embodiment, the land 352 executes the voltage detecting and the temperature detecting functions. Therefore, a detection temperature is accurate and an area of the circuit board 350 can be reduced.

In the storage battery module 20 according to the present embodiment, the chip type temperature sensor 381 is mounted at the circuit board 350. Therefore, a circuit board assembly can be reduced, storage and transportation are facilitated, and efficiency is also improved.

In the storage battery module 20 according to the present embodiment, the thermally conductive member 382 is interposed between the chip type temperature sensor 381 and the projected portion 353 of the land 352. Therefore, the temperature of the battery cell 320 can accurately be detected by preventing air from being interposed between the land 352 and the temperature sensor 381.

Second Embodiment

Figure 7:
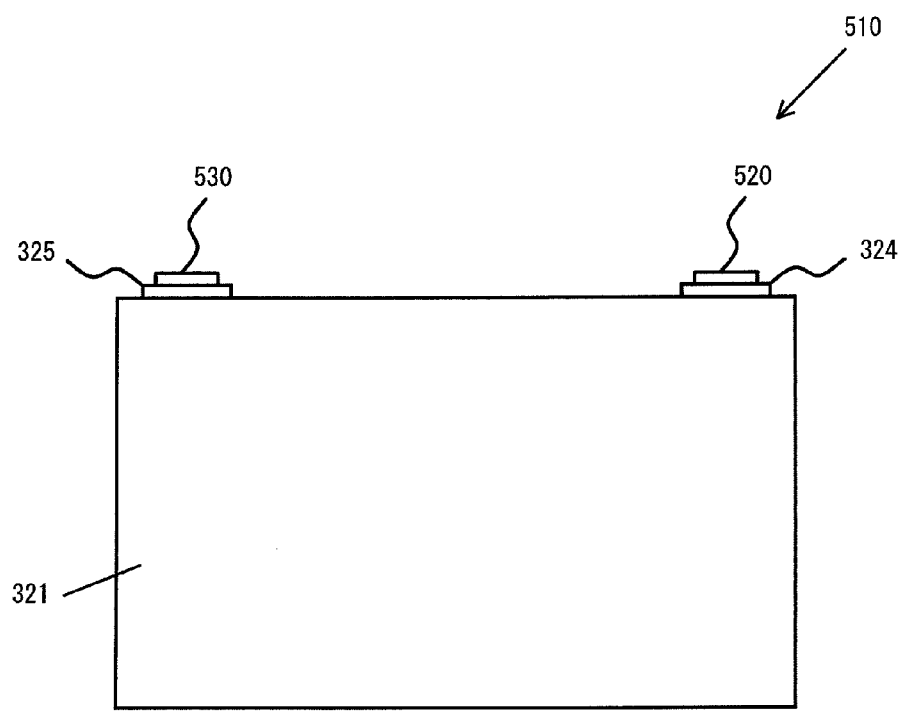
FIG. 7 is a front view of a battery cell configuring a storage battery module according to Second Embodiment of the present invention.
Figure 8:
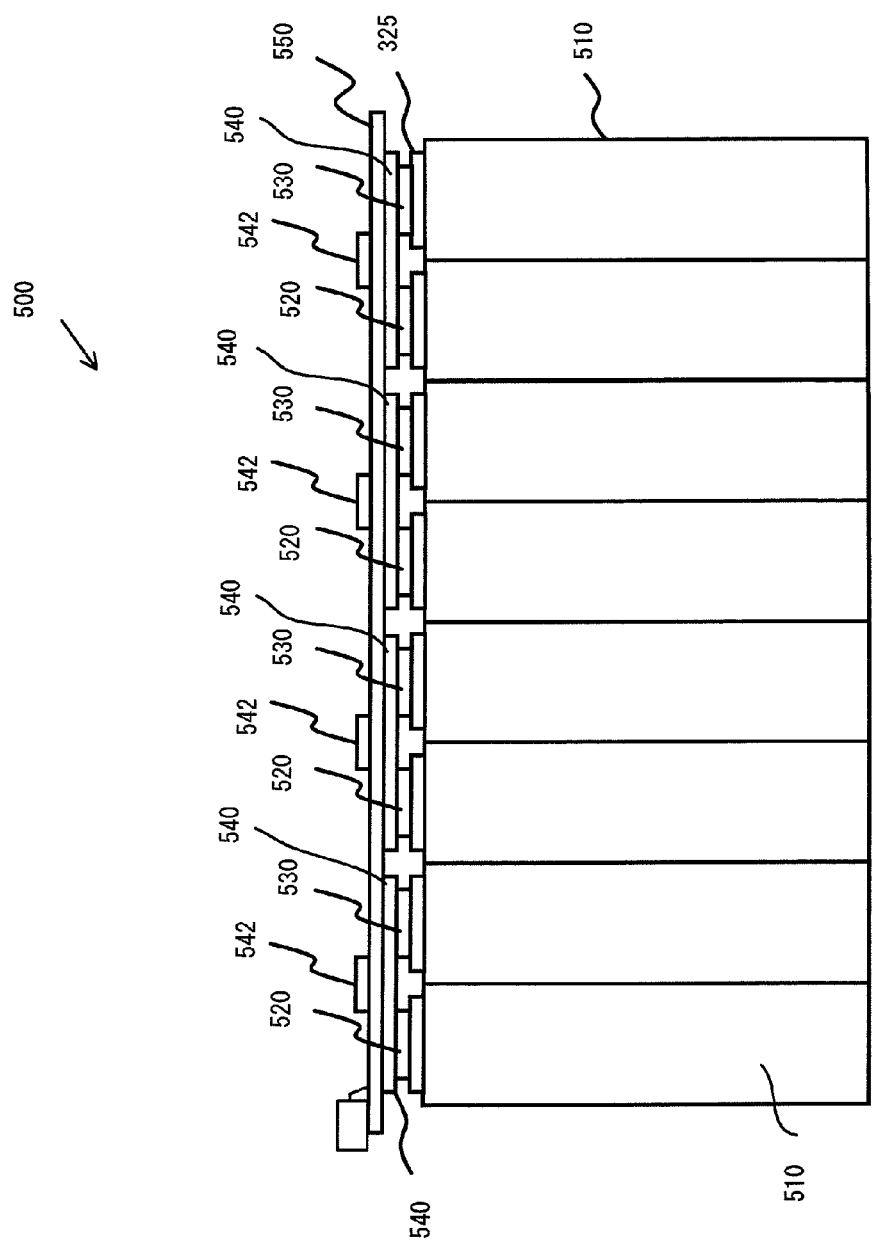
FIG. 8 is a total side view showing Second Embodiment of the storage battery module according to the present invention.

FIG. 7 is a front view of a battery cell configuring a storage battery module according to Second Embodiment of the present invention, and FIG. 8 is a total side view showing Second Embodiment of the storage battery module of the present invention.

According to Second Embodiment, there is configured a structure where a bus bar includes a bonding member bonding to a land of a circuit board.

An explanation will be given of the storage battery module according to Second Embodiment of the present invention in reference to the drawings as follows. The explanation will be given mainly of a configuration which differs from that of First Embodiment. The explanation will pertinently be omitted of a configuration the same as that of First Embodiment by attaching the same notation to the corresponding member.

Also the storage battery module 500 including 8 pieces of battery cells 510 is exemplified in Second Embodiment.

In the battery cell 510, a positive external terminal 520 and a negative external terminal 530 which are formed by being projected from the lid 321b of the battery case 321 while being insulated by the insulating member 325 are formed by a flat plate-like member which is not in a bolt-like shape.

A structure is configured such that the positive external terminal 520 and the negative external terminal 530 of one piece of the battery cell 510 are respectively connected to the negative external terminal 530 and the positive external terminal 520 of the different batter cells 510 by bus bars 540 similar to First Embodiment.

However, through hole formed at a circuit board 550 are not formed to respectively correspond to the negative external terminal 530 and the positive external terminal 520, but a single through hole is formed for a pair of the positive and the negative external terminals 520 and 530.

A projected portion 542 formed at the bus bar 540 is inserted to the through hole and is projected to an upper side of the circuit board 550.

Figure 9:
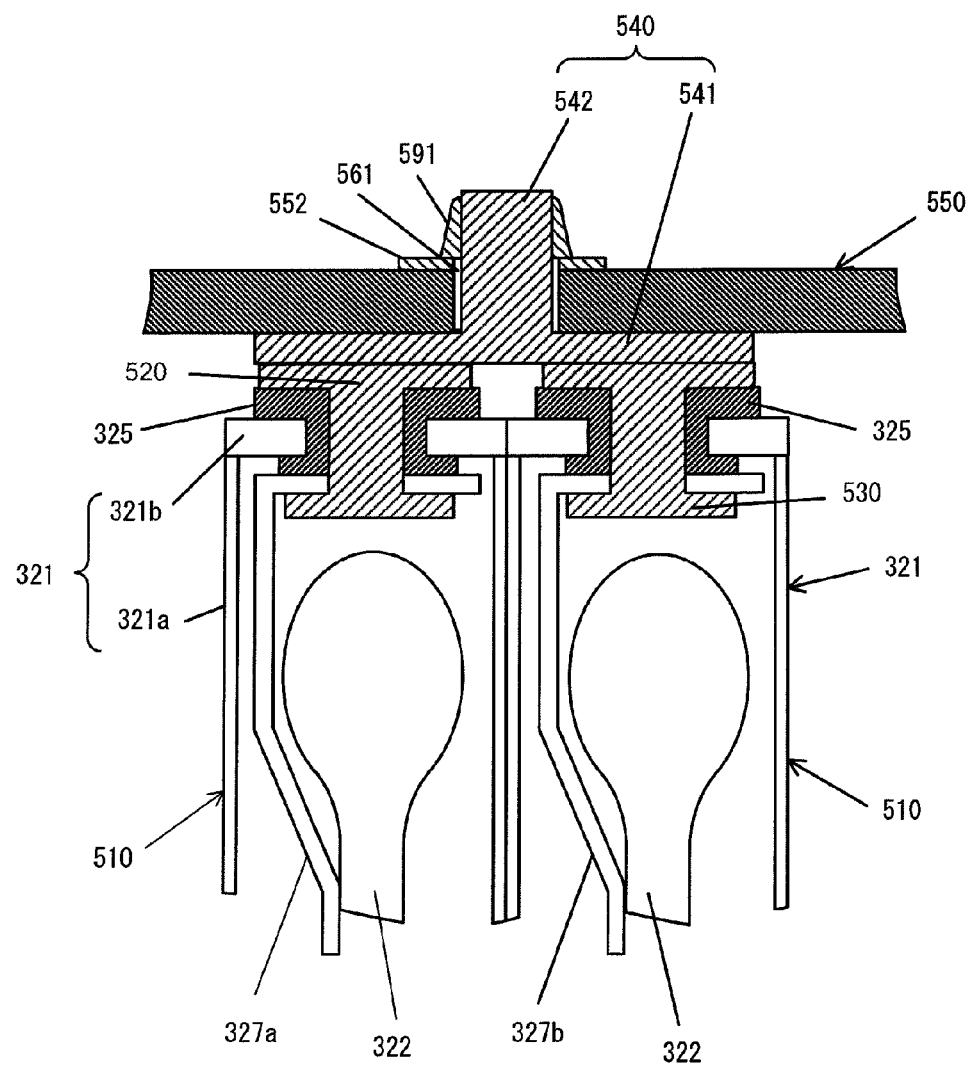
FIG. 9 is an enlarged sectional view cut along a line IX-IX of the storage battery module illustrated in FIG. 13.

FIG. 9 is a sectional view enlarging vicinities of the positive terminal and the negative terminal of a pair of the battery cells contiguous to each other, and is a sectional view cut along a line IX-IX of the storage battery module 500 illustrated in FIG. 13 described later.

The positive external terminal 520 and the negative external terminal 530 respectively include lower portions fixing the positive electrode and the negative electrode collector plates 327a and 327b and upper portions having flat outer faces.

A main body portion 541 of the bus bar 540 is welded to the respective upper portions of the positive external terminal 520 and the negative external terminal 530. The bus bar 540 includes a projected portion 542 vertically erected from the main body portion 541, and the projected portion 542 is soldered to a land 552 or 551 formed at a circuit board 550. In FIG. 9, numeral 591 designates a solder layer.

Figure 10:
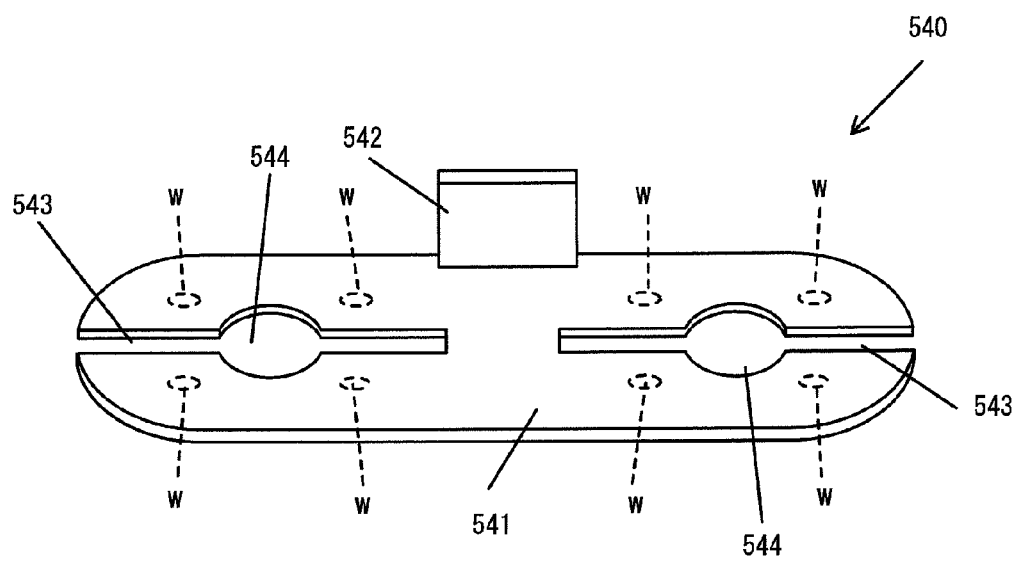
FIG. 10 is a perspective view of a bus bar for connecting battery cells illustrated in FIG. 9.

FIG. 10 is a perspective view of an outlook of the bus bar 540.

The bus bar 540 has a shape in line symmetry with respect to a center in a longitudinal direction. The main body portion 541 of the bus bar 540 is formed with slits 543 extended in the longitudinal direction and opened to outside at an end portion thereof substantially at a center in a width direction of the main body portion 541. Circular openings 544 are formed substantially at centers of the respective slits 543. The projected portion 542 erected substantially vertically to the main body portion 541 is formed at one side edge of a center portion of the main body portion 541.

The bus bar 540 can be formed by pressing a plate-like member. The projected portion 542 of the bus bar 540 is formed as an erected piece, and an upper face thereof has a slender rectangular shape.

Figure 12:
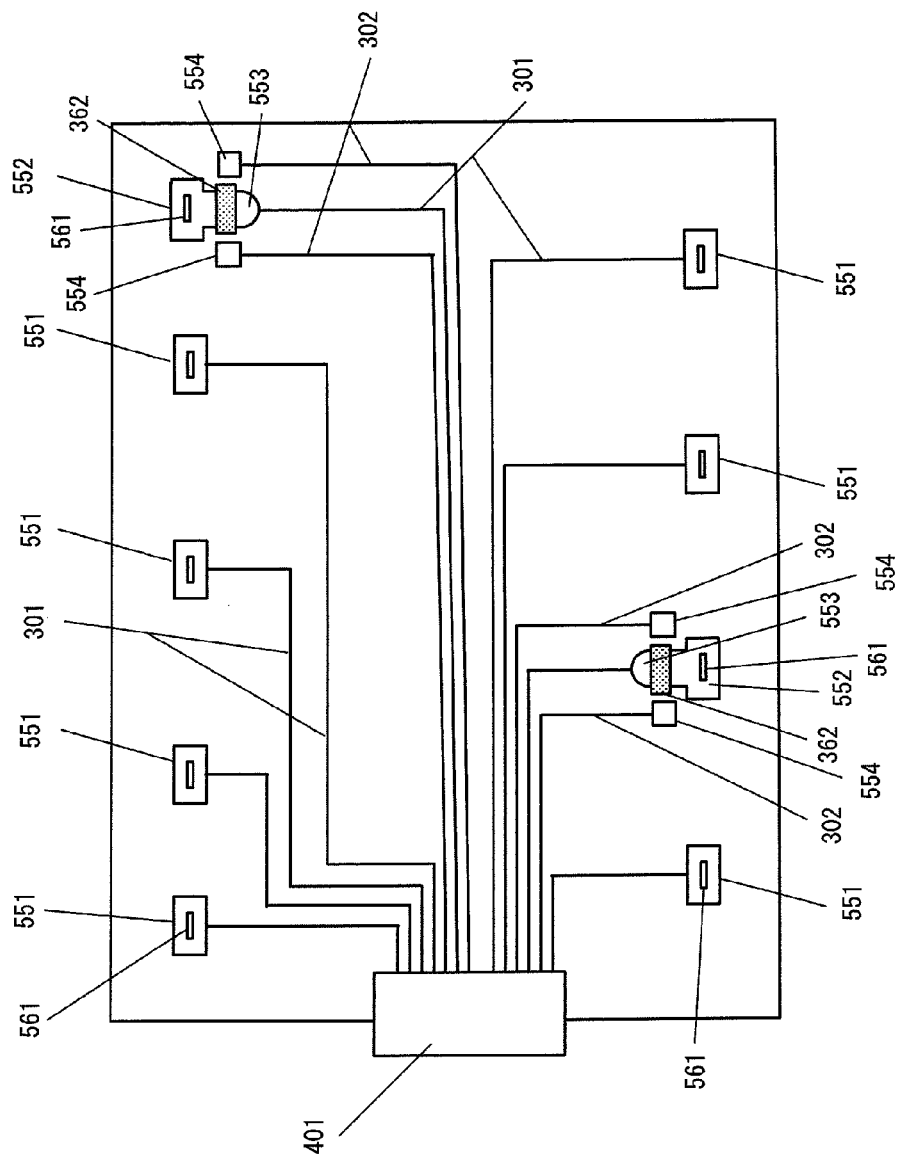
FIG. 12 is a plane view of a circuit board for detecting a voltage illustrated in FIG. 8.
Figure 13:
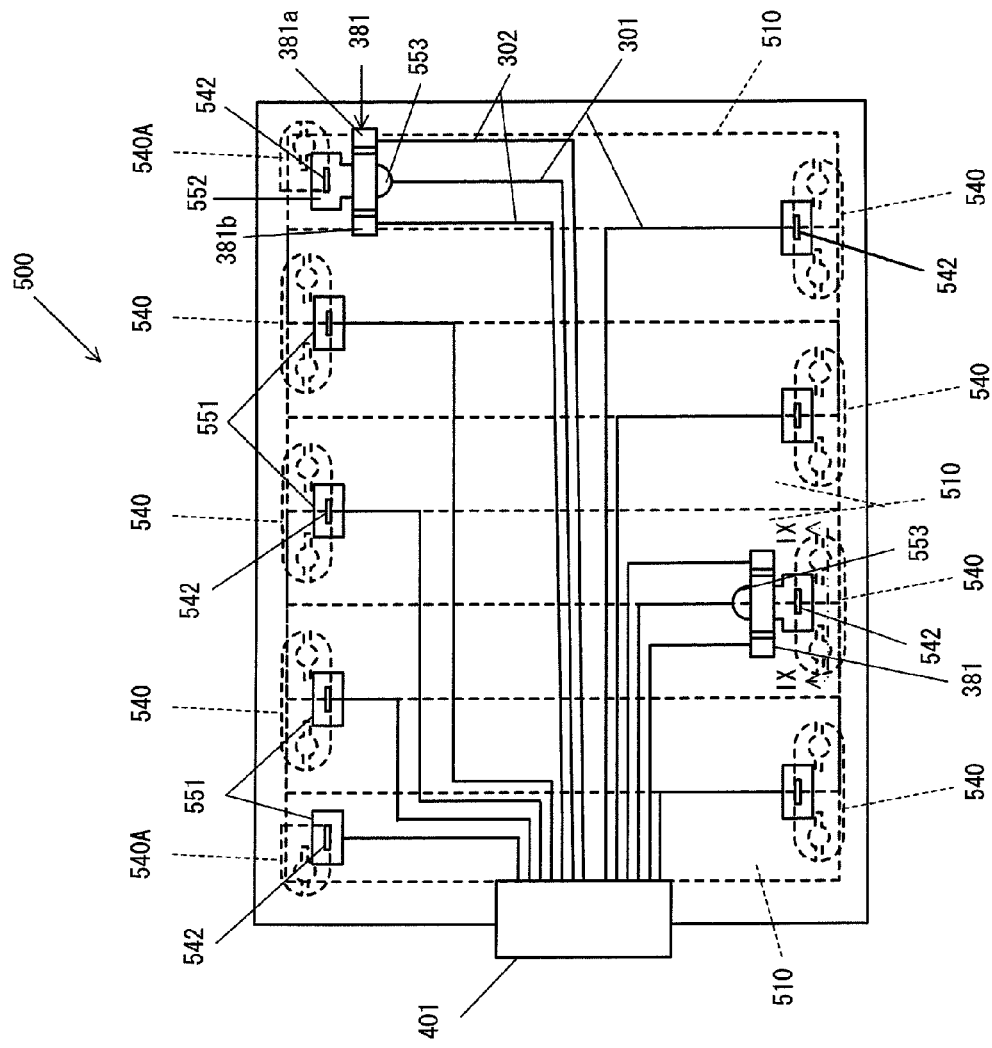
FIG. 13 is a plane view of the storage battery module illustrated in FIG. 8.

FIG. 12 is a plane view of a voltage detecting circuit board according to Second Embodiment, and FIG. 13 is a plane view viewing the storage battery module 500 illustrated in FIG. 8 from an upper side.

The circuit board 550 is formed with a through hole 561 having a slender rectangular shape in plane view at a position in correspondence with a boundary portion of the battery cells 510 contiguous to each other. The through holes 561 are formed also at positions of the negative external terminal 530 of the first battery cell 510 of an alignment of the storage battery module 500 and the positive external terminal 520 of the last battery cell 510.

The projected portion 542 of the bus bar 540 is fitted to the through hole 561 of the circuit board 550. The through hole 561 and the projected portion 542 of the bus bar 540 are formed in a rectangular shape prolonged in the longitudinal direction, and therefore, rattling in a state of the projected portion fitted to the through hole 561 can be reduced.

Bus bars 540A having a shape different from that of the bus bar 540 are fitted to the through holes 561 formed at positions in correspondence with the negative external terminal 530 of the first battery cell 510 of the alignment of the storage battery module 500 and the positive external terminal 520 of the last battery cell 510.

Figure 11:
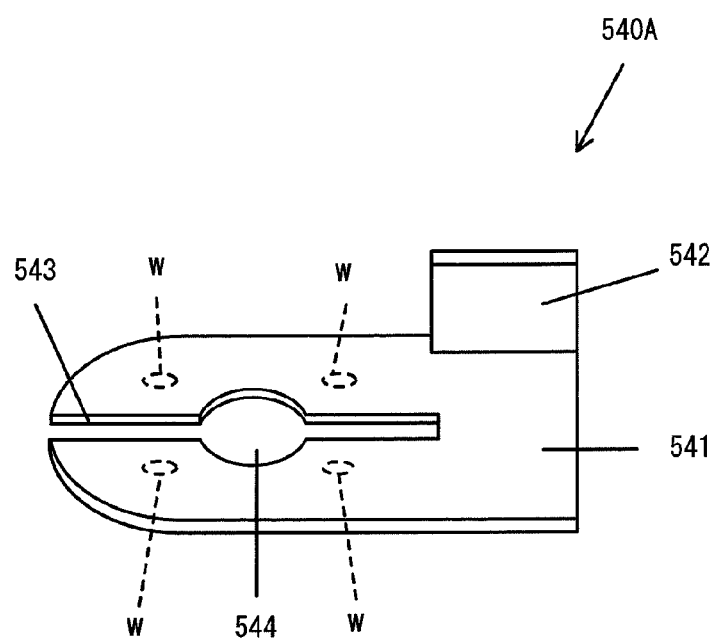
FIG. 11 is a perspective view of a bus bar for connecting wirings.

FIG. 11 is a perspective view of an outlook of the bus bar 540A.

The bus bar 540A is bonded to only one of the positive and the negative external terminals 520 and 530. Therefore, the bus bar 540A has a shape of cutting off substantially a half in the longitudinal direction of the bus bar 540. However, the projected portion 542 of the bus bar 540 has a shape and a dimension the same as those of the projected portion 542 of the bus bar 540. Therefore, all of the through holes 561 formed at the circuit board 550 can be configured by the same shape and dimension and can be made to have a general purpose property.

The bus bars 540 or 540A is bonded to the positive external terminal 520 or the negative external terminal 530 by arc welding of TIG welding or the like.

In FIG. 10 and FIG. 11, welded portions "w" welded to the positive and the negative external terminals 520 and 530 are indicated by dotted lines. Each of the positive and negative external terminals 520 and 530 is welded at four locations. Welded portion "w" are disposed at positions in the width direction where the slit 543 is substantially centered and positions in the longitudinal direction where the circuit opening 544 is substantially centered.

A function of the slit 543 and the circular opening 544 resides in improving welding between the bus bar 540 or 540A and the positive and the negative external terminals 520 and 530. In welding of arc welding or the like, it is important that the thermal energy in welding does not disperse to surroundings of a welded portion of a welded body but is concentrated on the welded portion in order to improve welding.

The bus bar 540 and 540A are formed with the slit 543 and the circular opening 544 among the respective welded portions "w". The thermal energy for welding radiated to the bus bar 540 or 540A is blocked by the slit 543 and the circular opening 544 from thermally conducted to surroundings.

Therefore, heat accumulated at the bus bar 540 or 540A is conducted to the positive and the negative external terminals 520 and 530 arranged right therebelow. That is, the thermal energy is concentrated on the welded portion "w", the welded portion "w" is melted at a temperature higher than those of surroundings, and excellent bonding is carried out.

A land 551 in a rectangular shape in plane view is formed at a surrounding of each through hole 561 of the circuit board 550 as illustrated in FIG. 12. Also, lands 552 having a shape different from that of the land 551 are formed at surroundings of the through holes 561 disposed at one side edge of a substantially center portion and a vicinity of one corner portion of the circuit board 550 illustrated in FIG. 12.

The land 552 includes a projected portion 553 extended to a center side of the circuit board 550 similar to the land 352 shown in First Embodiment. A thermally conductive member 362 is formed on the projected portion 553.

Pads 554 are formed on both sides in a width direction of the projected portion 553 of the circuit board 550.

The voltage detecting wiring 301 is connected to each land 551. The voltage detecting wiring 301 is also connected to a front end portion of the projected portion 553 of the land 352. The temperature detecting wiring 302 is connected to each pad 554.

As illustrated in FIG. 13, the projected portion 542 of the bus bar 540 is fitted to the through hole 561 of the circuit board 550, and the projected portion 542 is soldered to the land 551 or 552.

In this case, the projected portions 542 of the bus bar 540A are fitted to the through holes 561 formed in correspondence with the negative external terminal 530 of the first battery cell 510 of the alignment of the storage battery module 500 and the positive external terminal 520 of the last battery cell 510. The projected portion 542 of the bus bar 540A is also soldered to the land 551 or 552.

The chip type temperature sensor 381 is mounted on the thermally conductive member 362 formed on the projected portion 553 of the land 552, and the pair of connection terminals 381a and 381b of the temperature sensor 381 is soldered to the pads 554.

In the storage battery module 500 according to Second Embodiment of the present invention, the positive external terminal 520 and the negative external terminal 530 of the battery cells 510 contiguous to each other are connected by the bus bar 540. Each negative external terminal 530 is connected to the voltage detecting wiring 301 via the land 551 or 552 provided at the circuit board 550. The negative external terminal 530 of the first battery cell 510 of the alignment of the storage battery module 500 and the positive external terminal 520 of the last battery cell 510 are directly connected to the voltage detecting wirings 301 provided at the circuit board 550.

Therefore, the voltages of the respective battery cells are detected, signals with regard to the voltages are inputted to the microcomputer 30 via the battery control device 100, charging and discharging of the respective battery cells 510 are controlled, and dispersion of voltages among the battery cells 510 can be reduced.

In the storage battery module 500 according to Second Embodiment of the present invention, the temperature sensor 381 is mounted to the land 552 formed at the circuit board 550. Temperatures of the respective battery cells 510 are transferred from the positive and the negative external terminals 520 and 530 to the lands 552 via the bus bar 540, and therefore, temperatures of a pair of the battery cells 320 can be detected by the temperature sensor 381. Therefore, the inputted temperatures of the respective battery cells 510 or the storage battery module 500 can be controlled by the microcomputer 30 similar to the case of First Embodiment.

In the storage battery module 500 according to Second Embodiment of the present invention, the land 552 executes a voltage detecting function and a temperature detecting function. Therefore, a detected temperature is accurate and an area of the circuit board 550 can be reduced.

In the storage battery module 500 according to Second Embodiment of the present invention, the chip type temperature sensor 381 is mounted to the circuit board 550. Therefore, a circuit board assembly can be reduced, storage and transportation are facilitated, and efficiency is also improved.

In the storage battery module 500 according to Second Embodiment of the present invention, the bus bar 540 bonding the positive external terminal 520 and the negative external terminal 530 of the battery cells 510 contiguous to each other is directly fixed to the land 551 or 552 of the circuit board 550. Therefore, a number of parts can be reduced more than in the case of First Embodiment, and productivity can be improved.

Incidentally, in the respective embodiments described above, there is exemplified a case of detecting temperatures of the battery cells 320 and 510 of the storage battery modules 20 and 500 at portions of two locations. However, all of the lands formed at the circuit boards 350 and 550 may be configured by shapes having the projected portions 353 and 553 for mounting the temperature sensors 381 as in the lands 352 or 552.

When the temperatures of the respective cells 320 and 510 are detected in this way, in the battery control device 100, the temperatures can also be controlled respectively for the storage battery modules 20 and 500 by calculating average temperatures of the storage battery modules 20 and 500 other than monitoring and controlling the temperatures respectively for the pairs of battery cells 320 and 510 connected by the bus bars, and a control having a high reliability can be carried out.

In a case of a structure of detecting the all temperatures of pairs of battery cells 320 and 510 connected by the bus bars, the case is expensive as a whole. Therefore, the battery cells 320 and 510 at positions at which temperatures become the highest temperatures and the lowest temperatures may previously be confirmed by test or the like for respective storage battery modules, and the temperatures of the battery cells 320 and 510 at such positions may be detected.

In the respective embodiments described above, there is exemplified a case where the lands 352 and 552 for detecting temperatures are provided on upper face sides of the circuit boards 350 and 550. However, there may be constructed a through hole structure in which the lands 352 and 552 are also provided at lower faces of the circuit boards 350 and 550, and the upper and lower lands 352 and 552 are connected by the thermally conductive members. Thereby, thermal conductivities from the battery cells 320 and 510 to the lands can further be improved.

In the respective embodiments described above, there is exemplified a case where the lands 352 and 552 execute the voltage detecting function and the temperature detecting function. However, the temperature detecting land and the voltage detecting land may be formed separately from each other. As an example thereof, there is exemplified a case where the temperature detecting land and wirings are formed at one face of the circuit board, and the voltage detecting land and wirings are formed at the other face of the circuit board. In a case where temperatures of all of the battery cells 320 and 510 are made to be detected, a number of wirings is increased, the circuit board is large-sized, and therefore, the case can be dealt with by configuring the both face circuit board.

In the respective embodiments described above, there is exemplified a structure in which the lands 352 and 552 and the battery cells 320 and 510 are connected by fastening members or soldering. However, the present invention is not limited to the method but various methods are applicable to the present invention. For example, hook portions may be provided to the positive and the negative external terminals 331 and 341 in the case of First Embodiment and to the projected portion 542 of the bus bar 540 in the case of Second Embodiment, and the hook portions may be brought into contact with the lands 352 and 552. In this case, the hook portions may be folded to bend to press to the lands 352 and 552.

The storage battery modules 20 and 500 shown in the respective embodiments described above are applicable also to storage battery devices configuring power source devices other than that of an electric vehicle such as power source devices used in an interruption free power source device and a private power generation equipment which are used in a computer system, a server system and the like.

Otherwise, the storage battery module of the present invention can variously be modified to configure within the range of the gist of the present invention. In short, the storage battery module of the present invention may include plural battery cells in which an electrode group having positive pole and the negative pole electrodes, and positive electrode and negative electrode collector plates connected to the positive pole and the negative pole electrodes are accommodated in a battery cell, and the positive and the negative external terminals connected to the positive electrode and the negative electrode collector plates are provided to expose to an external portion of the battery cell, a circuit board having a wiring for detecting a temperature connected to the positive or the negative external terminal of the battery cell, and a temperature sensor thermally bonded to a wiring for detecting a temperature of the battery cell.

The invention claimed is:

1. A storage battery module comprising:
a plurality of battery cells in which an electrode group including a positive electrode and a negative electrode, and a positive electrode collector plate and a negative electrode collector plate connected to the positive electrode and the negative electrode are accommodated in a battery case, and a positive external terminal and a negative external terminal connected to the positive electrode collector plate and the negative electrode collector plate are provided to be exposed to outside of the battery case;
a circuit board including a wiring for temperature detection having a land and connected to the positive external terminal or the negative external terminal of the battery cell;
a temperature sensor that is thermally bonded to the land of the wiring and detects a temperature of the battery cell; and
a voltage detecting wiring for detecting a voltage of the battery cell connected to the land.

2. The storage battery module according to claim 1, further comprising:
a bus bar that connects external terminals of inverse polarities of the battery cells contiguous to each other,
wherein the circuit board includes through holes for inserting the positive external terminal and the negative external terminal, and the land is provided at a surrounding of the through hole.

3. A storage battery module comprising:
a plurality of battery cells in which an electrode group including a positive electrode and a negative electrode, and a positive electrode collector plate and a negative electrode collector plate connected to the positive electrode and the negative electrode are accommodated in a battery case, and a positive external terminal and a negative external terminal connected to the positive electrode collector plate and the negative electrode collector plate are provided to be exposed to outside of the battery case;
a circuit board including a wiring for temperature detection having a land and connected to the positive external terminal or the negative external terminal of the battery cell;
a temperature sensor that is thermally bonded to the land of the wiring and detects a temperature of the battery cell; and
a bus bar that connects external terminals of inverse polarities of the battery cells contiguous to each other,
wherein the circuit board includes a through hole for inserting a projected portion formed at the bus bar, and the land is provided at a surrounding of the through hole.

4. The storage battery module according to claim 3, wherein the bus bar includes welding areas welded to the positive external terminal and the negative external terminal, each of the welding areas includes a plurality of welding portions, and the bus bar includes a slit provided between the welding portions.

5. The storage battery module according to claim 3, wherein the projected portion of the bus bar and the land are soldered.

6. The storage battery module according to claim 1, wherein the temperature sensor is arranged on the land via a thermally conductive resin therebetween, and the land is formed such that a width of a portion at which the temperature sensor is disposed is narrower than a width of a portion connected to the external terminal.

7. The storage battery module according to claim 1, wherein the wiring and the temperature sensor are thermally bonded via a thermally conductive resin.

8. The storage battery module according to claim 3, wherein a voltage detecting wiring for detecting a voltage of the battery cell is formed at the land.

9. The storage battery module according to claim 3, wherein the temperature sensor is arranged on the land via a thermally conductive resin therebetween, and the land is formed such that a width of a portion at which the temperature sensor is disposed is narrower than a width of a portion connected to the external terminal.

10. The storage battery module according to claim 3, wherein the wiring and the temperature sensor are thermally bonded via a thermally conductive resin.

* * * * *